April 4, 1967   J. J. WILSON   3,312,587
STABLE SILICONE RUBBER INTERLAYERS FOR GLASS
Filed May 18, 1964
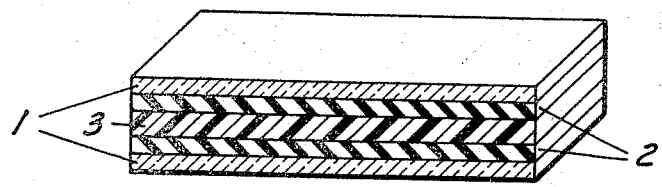
INVENTOR.
JOHN J. WILSON
BY Robert F. Fleming Jr.

United States Patent Office 3,312,587
Patented Apr. 4, 1967

3,312,587
STABLE SILICONE RUBBER INTERLAYERS
FOR GLASS
John J. Wilson, Midland, Mich., assignor to Dow Corning Corporation, Midland, Mich., a corporation of Michigan
Filed May 18, 1964, Ser. No. 368,089
8 Claims. (Cl. 161—193)

This application relates to new, transparent interlayers for safety glass that possess excellent heat stability.

Silicone rubber glass interlayers are well known and are in commercial use. Their compositions are disclosed in U.S. Patents 3,036,985 and 3,094,446, which patents are made a part of this disclosure.

These transparent silicone rubber interlayers are sandwiched between two sheets of glass to prevent the glass from shattering in event of breakage. An adhesive agent such as ethylpolysilicate is generally added to the silicone interlayer to promote adhesion between the silicone and the glass.

The advantage of silicone interlayers is that they will stand temperatures far above the temperatures that purely organic interlayers, such as those used for automobile safety glass, will stand. Silicone interlayers have special value in the windows of supersonic aircraft, which must resist high temperatures.

It has been found, however, that the adhesive agent which causes the silicone interlayer to firmly adhere to the glass often reduces temperature stability of the silicone.

The invention disclosed in this application corrects this defect.

This application relates to the method of forming a composite article comprising (1) Laminating to (A) transparent, nonelastomeric solid sheets with a melting point of over 300° F., a layer (B) of transparent, uncured silicone elastomer containing from 0.5 to 10 weight percent based on (B) of a compound selected from the group consisting of lower alkyl orthosilicates and polysilicates, (2) Laminating to (B) a layer of (C) transparent, uncured silicone elastomer containing no lower alkyl silicate, (3) Assembling the laminates so that the resulting structure is composed of alternate layers in the order (A), (B), (C), (B), (A) so that between any two layers of (A) the combined thickness of the (B) layers is no more than twice that of (C) and (4 Thereafter heating the assembly to cure the silicone elastomer.

The drawing shows a cross-section of the laminate of this invention. The layers marked "1" are made of the transparent, nonelastomeric solid; the layers marked "2" are made of silicone rubber which contains lower alkyl silicate, and the layer marked "3" is made of silicone rubber that originally contained no silicate, though it is believed that silicate migrates to it during the cure of the laminate.

The laminate of this invention can also contain inner layers of transparent, nonelastomeric solid, but each of such layers must be separated by layers (B) and (C) as described above.

The transparent, nonelastomeric solid is most commonly glass, but it can be any transparent, nonelastomeric solid with a melting point of over 300° F. such as fused quartz or Plexiglas which is polymethylmethacrylate. One side of the laminate can be one kind of transparent solid and the other side another. For example, a laminate with glass on one side and Plexiglas on the other can be made.

There are many well-known transparent, heat-curable silicone elastomer stocks. Most silicone elastomers would be transparent, if they had the proper filler. Methods of making these compositions are found in the above-cited patents.

Any lower alkyl orthosilicate or polysilicate is useful in the composition of this invention. Examples are methyl orthosilicate, ethyl orthosilicate, hexyl orthosilicate, methyl polysilicate, ethyl polysilicate, and isopropyl polysilicate.

During curing, part of the alkyl silicate adhesive agent is believed to migrate to the silicone elastomer which contains no alkyl silicate, thus lowering the alkyl silicate content of the outer layers of the elastomer, but this does not happen before a good elastomer-glass (or whatever transparent, nonelastomeric solid is used) bond is formed. The resulting laminate therefore has excellent adhesion, yet the elastomer has a sufficiently low alkyl silicate content to exhibit good heat stability.

It is preferred for the total thickness of the elastomer containing no alkyl silicate to be greater than the total thickness of the elastomer containing alkyl silicate, as measured in the laminate where this invention is used.

There is generally no difficulty in causing the sheets of unvulcanized silicone elastomer stock to adhere to each other. Mere contact during cure is sufficient to create a good bond.

The following examples are illustrative only and should not be construed as limiting the invention which is properly delineated in the appended claims.

Example 1

The following elastomer stock was milled until homogeneous: 100 parts by weight of a dimethylpolysiloxane containing a small amount of vinyl and phenyl substituents, and having a Williams plasticity of about 50, 30 parts of a cohydrogel containing $MeSiO_{3/2}$ and $SiO_{4/2}$ groups, 0.2 part of dicumyl peroxide, and 3 parts of ethyl polysilicate.

The transparent composition was calendered between polyethylene sheets and portions of this were transferred from the polyethylene sheets to two glass panes that were 12 inches square, the calendered elastomer stock thickness being 0.015 inch.

A similar composition was made that contained no ethyl polysilicate. This was calendered between two polyethylene sheets, and then transferred from the polyethylene to the top of the elastomer stock already on one of the glass panes, a thickness of 0.075 inch being applied. The elastomer stock on the other glass pane was then brought in contact with the newly-applied elastomer stock to form a laminate with glass on both sides and the three layers of silicone elastomer stock between the glass plates.

The laminate was heat-cured at 300° F. and at 200 p.s.i. Another laminate was made by calendering 0.1 inch of the above-described ethyl polysilicate-containing elastomer stock in the above manner, and applying it to a 12 inch square glass pane, then laying another glass pane on the calendered elastomer stock. The laminate was heat-cured at 300° F. and at 200 p.s.i.

These laminates, and others identical to them, were aged at varying temperatures. The time of visual failure, i.e. when obvious delamination had occurred, is recorded below:

| Laminate | Hours aged before failure at— | | |
|---|---|---|---|
| | 300° F. | 330° F. | 360° F. |
| All the interlayer contains ethyl polysilicate | >270 | 124–141 | 29–35 |
| The central portion of the interlayer originally contains no ethyl polysilicate | >270 | >200 | >200 |

That which is claimed is:

1. The method of forming a composite article comprising
   (1) laminating to (A) transparent, nonelastomeric solid sheets from the group consisting of glass, fused quartz and polymethyl methacrylate, a layer (B) of transparent, uncured silicone elastomer containing from 0.5 to 10 weight percent based on (B) of a compound selected from the group consisting of lower alkyl orthosilicates and polysilicates,
   (2) laminating to (B) a layer of (C) transparent, uncured silicone elastomer containing no lower alkyl orthosilicates and no polysilicates,
   (3) assembling the laminates so that the resulting structure is composed of alternate layers in the order (A), (B), (C), (B), (A) so that between any two layers of (A) the combined thickness of the (B) layers is no more than twice that of (C) and
   (4) Thereafter heating the assembly to cure the silicone elastomer.

2. The process of claim 1 where the siloxane elastomer stock used is a heat hardenable composition of matter consisting essentially of
   (1) an organopolysiloxane in which at least 50 mol percent of the polymer units are dimethylsiloxane units, any remaining polymer units being of the formula $R'_n SiO_{4-n/2}$ in which $R'$ is a monovalent hydrocarbon radical having less than 10 carbon atoms and $n$ has an average value from 1.9 to 2.1 inclusive,
   (2) A filler having a pore volume of at least 3 cc. per g. which is composed of a copolymer of
      (A) from 1 to 50 mol percent $RSiO_{3/2}$ units in which R is an aliphatic hydrocarbon radical of less than 5 carbon atoms,
      (B) from 4 to 30 mol percent $(CH_3)_n SiO_{4-n/2}$ units in which $n$ is an integer from 2 to 3 inclusive and
      (C) from 46 to 95 mol percent $SiO_2$ units and
   (3) a vulcanizing agent, and the lower alkyl silicate which is used is ethyl polysilicate.

3. The process of claim 1 where the siloxane elastomer stock used is a heat hardenable composition of matter consisting essentially of
   (1) an organopolysiloxane in which at least 50 mol percent of the polymer units are dimethylsiloxane units, any remaining polymer units being of the formula $R'_2 SiO$ in which $R'$ is selected from the group consisting of methyl, phenyl and vinyl radicals,
   (2) a filler having a pore volume of at least 3 cc. per g. which is composed of a copolymer of from 1 to 50 mol percent $CH_3 SiO_{3/2}$ units, from 4 to 30 mol percent $(CH_3)_3 SiO_{.5}$ units and from 46 to 95 mol percent $SiO_2$ units and
   (3) a vulcanizing agent, and the lower alkyl silicate which is used is ethyl polysilicate.

4. The process of claim 1 where (A) is glass.

5. A laminate having outer layers of (A) transparent, nonelastomeric solid sheeting from the group consisting of glass, fused quartz, and polymethyl methacrylate, bonded with a transparent silicone elastomer, the improvement comprising
   (1) having adjacent the inner side of (A) a layer (B) of transparent siloxane elastomer having originally mixed therein from 0.5 to 10 percent by weight based on the weight of (B) of a compound selected from the group consisting of lower alkyl orthosilicates and polysilicates,
   (2) the opposite side of layers (B) being bonded to at least one layer (C) of a transparent organosilicon elastomer having originally mixed therewith no lower alkyl orthosilicates and no polysilicates, there being between any two layers of (A) a total thickness of layers (B) which are no more than twice the thickness of (C).

6. The laminate of claim 5 where the siloxane elastomer used is a vulcanized elastomeric composition consisting essentially of
   (1) an organopolysiloxane in which at least 50 mol percent of the polymer units are dimethylsiloxane units, any remaining polymer units being of the formula $R'_n SiO_{4-n/2}$ in which $R'$ is a monovalent hydrocarbon radical of less than 10 carbon atoms and $n$ has an average value of from 1.9 to 2.1 and
   (2) a filler having a pore volume of at least 3 cc. per g. which is composed of a copolymer of
      (A) from 1 to 50 mol percent $RSiO_{3/2}$ units in which R is an aliphatic hydrocarbon radical of less than 5 carbon atoms,
      (B) from 4 to 30 mol percent $(CH_3)_n SiO_{4-n/2}$ units in which $n$ is an integer from 2 to 3 inclusive and
      (C) from 64 to 95 mol percent $SiO_2$ units and the lower alkyl silicate which is used is ethyl polysilicate.

7. The laminate of claim 5 where the siloxane elastomer used is a vulcanized elastomeric composition consisting essentially of
   (1) an organopolysiloxane in which at least 50 mol percent of the polymer units are dimethylsiloxane units, any remaining polymer units being of the formula $R'_2 SiO$ in which $R'$ is selected from the group consisting of methyl, phenyl and vinyl radicals and
   (2) a filler having a pore volume of at least 3 cc. per g. which is composed of a copolymer of from 1 to 50 mol percent $CH_3 SiO_{3/2}$ units, from 4 to 30 mol percent $(CH_3)_3 SiO_{.5}$ units and from 46 to 95 mol percent $SiO_2$ units, and the lower alkyl silicate which is used is ethyl polysilicate.

8. The laminate of claim 5 where the transparent, nonelastomeric solid sheeting is glass.

References Cited by the Examiner

UNITED STATES PATENTS

| | | | |
|---|---|---|---|
| 2,557,778 | 6/1951 | Barry | 161—193 |
| 2,860,083 | 11/1958 | Nitzsche et al. | 161—193 |
| 3,261,739 | 7/1966 | Porter | 161—193 |

ALEXANDER WYMAN, *Primary Examiner.*

W. J. VANBALEN, *Assistant Examiner.*